United States Patent [19]
Shimizu et al.

[11] Patent Number: 5,861,879
[45] Date of Patent: Jan. 19, 1999

[54] VIDEO SIGNAL PROCESSING DEVICE FOR WRITING AND READING A VIDEO SIGNAL WITH RESPECT TO A MEMORY ACCORDING TO DIFFERENT CLOCKS, WHILE PREVENTING A WRITE/READ ADDRESS PASS-BY IN THE MEMORY

[75] Inventors: Yutaka Shimizu, Ota; Hideaki Sasaki, Ora-gun; Shigeru Sawada, Kitasouma-gun; Teruo Hotta, Noda, all of Japan

[73] Assignees: Sanyo Electric Co., Ltd., Osaka; Victor Company of Japan, Ltd., Yokohama, both of Japan

[21] Appl. No.: 722,341

[22] Filed: Sep. 27, 1996

[30] Foreign Application Priority Data

Sep. 29, 1995 [JP] Japan .................................. 7-252115

[51] Int. Cl.⁶ ...................................................... H04L 7/00
[52] U.S. Cl. .......................... 345/213; 345/204; 348/500; 348/513
[58] Field of Search ..................... 345/204, 213, 345/1–3, 132; 348/500, 512, 513, 510, 518, 536, 547

[56] References Cited

U.S. PATENT DOCUMENTS

| 4,018,990 | 4/1977 | Long et al. | 348/990 |
| 5,291,275 | 3/1994 | Lumelsky | 348/441 |
| 5,335,337 | 8/1994 | Gagliarado et al. | 395/500 |

*Primary Examiner*—Mark K. Zimmerman
*Assistant Examiner*—Vincent E. Kovalick
*Attorney, Agent, or Firm*—Loeb & Loeb LLP

[57] ABSTRACT

An input video signal is written into alternate field memories M1 and M2, according to a timing clock from an input video clock generator. A display video signal is alternately read from those field memories, according to a timing clock from a display video clock generator. In switching a read memory, an address observation circuit judges whether or not a read/write address passes by a write/read address, referring to the condition of reading and writing operations. In this event, the circuit makes a judgement, based on the lag between a vertical synchronizing signals of an input video signal and of a display video signal, and a change of the lag with time. If it is judged that one address will pass by the other, the same read/write memory is again accessed for reading/writing. With this arrangement, there is provided a circuit having a relatively simple structure for preventing a match of read and write addresses.

10 Claims, 11 Drawing Sheets

US 5,861,879

VIDEO SIGNAL PROCESSING DEVICE FOR WRITING AND READING A VIDEO SIGNAL WITH RESPECT TO A MEMORY ACCORDING TO DIFFERENT CLOCKS, WHILE PREVENTING A WRITE/READ ADDRESS PASS-BY IN THE MEMORY

BACKGROUND OF THE INVENTION

1. Field of the Invention

The present invention relates to a video signal processing device for obtaining a display video signal according to a synchronizing signal different from that for an input video signal. The video signal processing device writes an input video signal into a memory according to a write clock based on a synchronizing signal and reads a video signal from a memory according to a read clock based on a different synchronizing signal. In particular, the present invention relates to solution for problems stemming from a difference between write and read clocks.

2. Description of the Prior Art

With the development of personal computers, video signals in various display systems, such as the VAG standard (480 scanning lines/sec., approx. 60 frames/sec., non-interlace), have been utilized in addition to extant systems, such as the NTSC standard (525 scanning lines, 30 frames/sec., 60 fields/sec., interlace). The use of a variety of display systems for various video signals causes situations where video signal input in some systems (an input video signal) is read as a display video signal in a different system. In such a case, an input video signal must be converted into the system of a display video signal.

For this purpose, a field memory M, or the like, is provided so that an input video signal is written thereto, as shown in FIG. 1. A video signal supplied to the memory M is controlled by various signals from an input video clock generator 1. Receiving a horizontal synchronizing signal (an input H) and a vertical synchronizing signal (an input V) of an input video signal, the input video clock generator 1 outputs a write clock (WCLK), a write address reset signal (WRST), and a write enabling signal (WE) to the field memory M in synchronism with the input H and V. The field memory M, including a write counter, successively counts addresses of the write counter in response to the various clocks received, whereby an input video signal is written into the field memory M for every field.

On the other hand, a display video signal is read from the field memory M in response to various signals from a display video clock generator 2. Receiving a horizontal synchronizing signal (a display H) and a vertical synchronizing signal (a display V) of a display video signal, the display video clock generator 2 outputs a read clock (RCLK), a read address reset signal (RRST), and a read enabling signal (WE) to the field memory M. The field memory M, including a read counter as well, successively counts up addresses of the read counter so that a display video signal is read from the field memory M.

In this device, since display H and V signals can be arranged as desired, an input video signal can be converted into a display video signal synchronous to the input video signal. Note that a frame memory may be employed as a memory in lieu of a field memory.

In this arrangement, if a frame frequency of an input signal is higher than that of a display picture device (that is, a WCLK is faster than a RCLK), a write address may pass by a read address in a memory. If such a pass-by occurs within one memory (a frame memory, or the like), a display video signal read from memory after the pass-by is video data regarding the next frame, i.e. behind frame in terms of time. Displaying such display data intact will result in displaying video data in which a frame is switched into a different frame within a single frame period, which causes significant degrading of display quality.

On the other hand, in cases where a read address passes by a write address, a display video signal read from the memory after the pass-by is video data regarding the prior frame, i.e. ahead frame in terms of time, thus, display video data in which a frame is switched into a different frame ahead within a single scene frame period, resulting in degradation of display quality similar above.

In order to solve the above problem, it has been proposed to constantly observe write and read addresses so as to prohibit writing of video data for the frame to the memory, if it is detected that a pass-by will occur at some frame period.

According to this method, when a write address of a prior frame is passing by a read address of the next frame, the video signal for the next frame is not written into a memory. Instead, the video signal for one frame is discarded to thereby prevent occurrence of a pass-by. As a result, although a video signal for one frame is omitted in displaying, degrading of display quality within one scene can be prevented.

In cases, similar to the above, where a read address is about to pass by a write address of the next frame, a video signal for the next frame is not written into a memory. Instead, the video signal for the next frame is discarded, and the prior frame is repeatedly displayed. A writing operation is resumed from the video signal for a frame subsequent to the discarded frame, and a reading operation is accordingly resumed from that frame. As a result, although the discarded frame is not displayed, and the same frame is repeated, degrading of display quality within one frame period can be prevented.

For the above process of stopping a writing operation, however, read and write addresses must be constantly observed so as to predict whether or not a pass-by will occur until the start of a reading/writing operation of a video signal for a frame for which read and write addresses become the same. Further, if a frame frequency of an input video signal varies within a wide range, a large circuit is required for execution of comparison between read and write addresses and the above prediction.

SUMMARY OF THE INVENTION

The present invention has conceived in view of the above problems and thus aims to provide a video signal processing device for preventing occurrence of a pass-by, by either write or read addresses, and having a relatively simple circuit.

According to the present invention, there is provided a video signal processing device for obtaining a display video signal according to a synchronizing signal different from a synchronizing signal for an input video signal through writing an input video signal into a memory according to a write clock and reading a video signal from a memory according to a read clock, comprising: a lag amount detection circuit for detecting a lag amount between a vertical synchronizing signal of a display video signal and a vertical synchronizing signal of an input video signal; a varied lag amount detection circuit for detecting an amount varied with time of the lag amount detected; a comparison circuit for comparing the lag amount detected and the amount varied with time of the lag amount; and a control circuit for controlling an access to a memory, based on a result by the comparison circuit.

When writing and reading clocks to a memory differ, either a writing or reading operation (the one with the faster clock) passes by the other. In the present invention, occurrence of an address pass-by is detected, based on a lag between vertical synchronizing signals of an input video signal and a display video signal and a variation thereof, so as to detect the need of switching accesses to memories. In this event, detection of the lag between vertical synchronizing signals of an input video signal and a display video signal can be easily achieved through counting the number of a horizontal synchronizing signals by a counter, rather than through a constant observation of write and read addresses. Thus, an address pass-by can be easily detected, even if an input video signal has a larger or smaller frame frequency. As a result, the present invention can be preferably applied to devices having a widely varying frame frequencies.

According to another aspect of the present invention, the video signal processing device further comprises the memory including two memory circuits; a judgement circuit for judging whether or not a writing operation and a reading operation are both executed to the same memory; and the control circuit for controlling an access in response to results of the comparison circuit and the judgement circuit, such that a memory accessed for reading or writing is repeatedly accessed for reading or writing.

As an example, a read address is switched under control by the control circuit. Provided that a read clock is faster than a write clock, a read address passes by a write address. In this event, according to the present invention, the memory from which data was read is again used as a read memory to display the same video so that writing of the next video signal is completed while the same video is displayed. In this way, video data for one period (frame or field) is inserted. On the other hand, in cases where a write clock is faster than a read clock, video data is read from the same memory from which the previous video data was read, so that a video is displayed with one period (frame or field) omitted. New video data is written onto the omitted video data. With this arrangement, video data for one period can be erased while a write side continues writing video data into two alternate memories. Note that the same advantage can be obtained by switching a write memory when one address passes by the other.

According to another aspect of the present invention, the video signal processing device further comprises the two memory circuits, each consisting of a field memory, for storing a video signal for one field alternately; and a video gravity center correction circuit for shifting a video signal of one field for a purpose of correcting a reverse between an odd field and an even field of a display video signal.

When two field memories are employed for the two memories, video data is inserted or deleted in field units, which causes a reverse between odd and even fields in a displaying image data, resulting in reversing an order of scanning lines. In order to solve this problem stemming from insertion or deletion of video data for one field, a video center is corrected through adjusting the position of one of the fields.

According to another aspect of the invention, the video signal processing device further comprises the lag amount detection circuit detecting a previous lag amount and a current lag amount regarding two adjacent vertical synchronizing signals of an input video signal or a display video signal, the varied lag amount detection circuit detecting an amount varied with time of a lag amount, based on a difference between the previous lag amount and the current lag amount, and the comparison circuit comparing the current lag amount and an amount varied with time of a lag amount currently detected and judges whether or not a preceding-following relationship between vertical synchronizing signals of an input video signal and a display video signal will be reversed in accordance with a variation of a lag amount until next detection.

As described above, a write/read address pass-by can be easily detected through lag A, B detection by a counter and detection of an amount varied with time of the lag |A–B| and a variation of the log until next detection |L–B| through simple computation.

According to another aspect of the invention, there is provided a video signal processing device for obtaining a display video signal according to a synchronizing signal different from a synchronizing signal for an input video signal by writing an input video signal into a memory according to a write clock and reading a video signal from a memory according to a read clock, comprising: two memories each accessed alternately for writing an input video signal or reading a display video signal; and a judgement circuit for judging whether or not one of read/write addresses will pass by one of write/read addresses when accessing a same memory, wherein upon detection that one address will pass by another address, the same memory is repeatedly accessed for data reading or writing, prohibiting a change of a read or write memory.

With this arrangement, a video signal is usually alternately written into two memories, and a video signal is repeatedly written into or read from the same memory when an address pass-by is expected. In this way, field/frame insertion/deletion can be achieved with a simple means, such as switching of a read/write memory. For instance, two memories are constantly accessed alternately for writing, while the same memory is repeatedly accessed for reading when an address pass-by occurs. With this arrangement, when a read clock is faster than a write clock, the same video is repeatedly displayed. On the other hand, with a slower read clock than a write clock, video data stored in the other memory is omitted.

BRIEF DESCRIPTION OF THE DRAWINGS

The above and other objects, features, and advantages will be further apparent from the following description of the preferred embodiment taken in conjunction with the accompanying drawings wherein.

DESCRIPTION OF THE PREFERRED EMBODIMENTS

A preferred embodiment of the present invention will next be described based on the attached drawings.

Overall Structure

Figure 1:
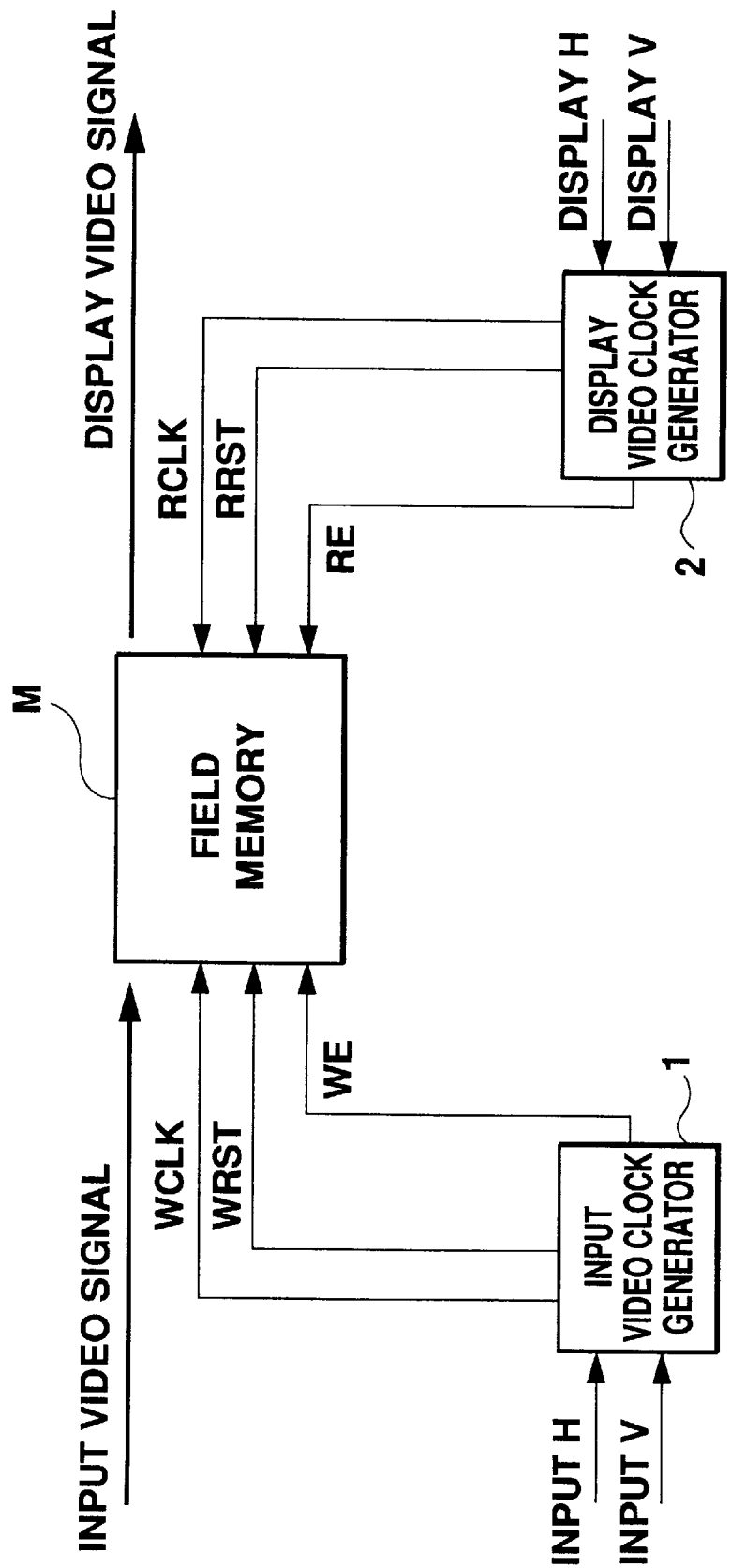
FIG. 1 is a block diagram showing the structure of a conventional video signal processing device.
Figure 2:
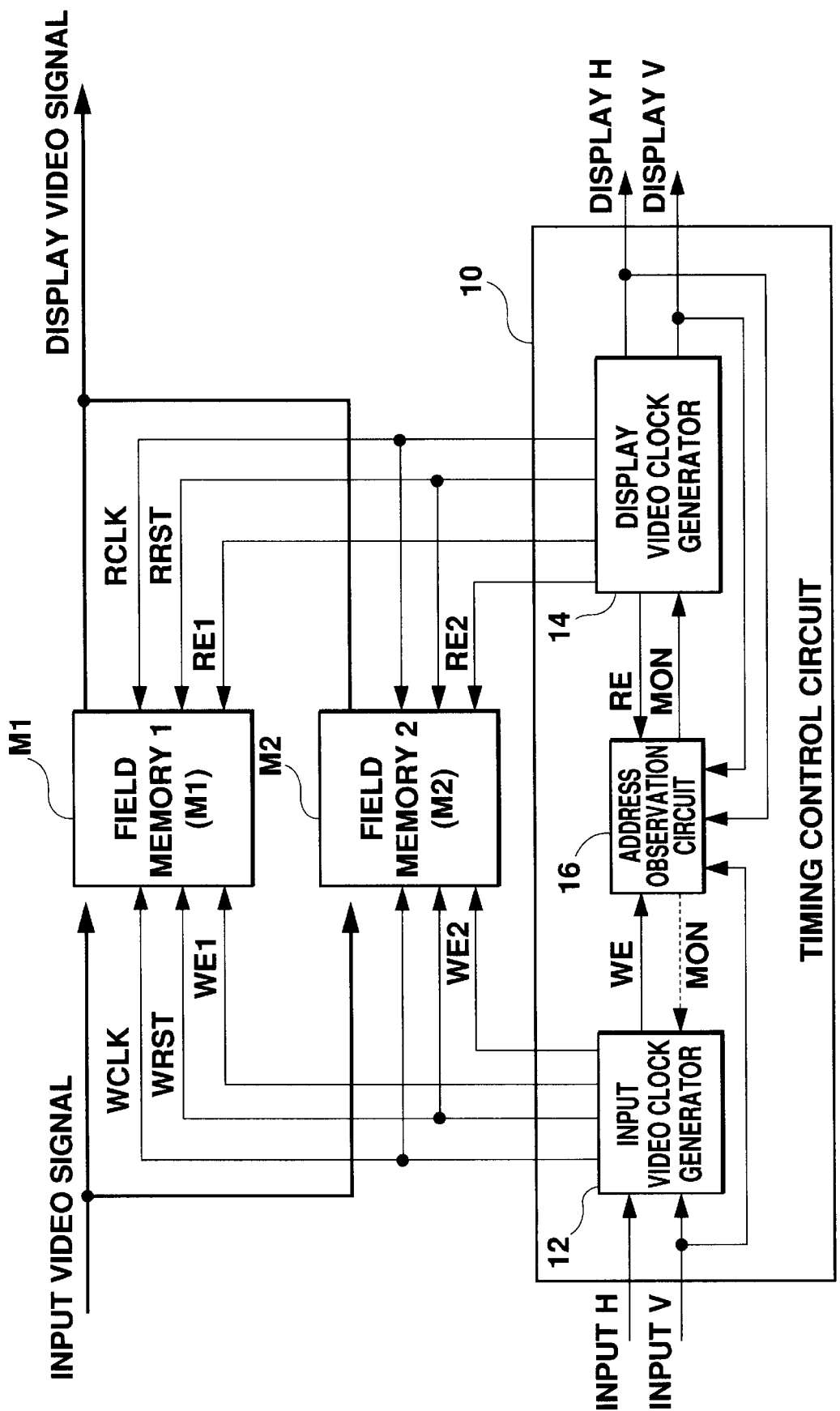
FIG. 2 is a block diagram showing an entire structure of a video signal processing device according to a preferred embodiment of the present invention.

An overall structure of a video signal processing device of a preferred embodiment will be described with reference to FIG. 2.

An input video signal is alternately supplied to in field memories M1 and M2 to be stored therein. A display video signal is read from the field memories M1 and M2, as a principle, alternately. Accesses to the field memories M1 and M2 are controlled by a timing control circuit 10.

A horizontal synchronizing signal (input H) and a vertical synchronizing signal (input V) of an input video signal are supplied to an input video clock generator 12 of the timing control circuit 10 to be held therein. In response to the input H and V signals, the input video clock generator 12 outputs to the field memories M1 and M2 a write clock (WCLK), a write address reset signal (WRST), and a write enable signal (WE1, WE2) so as to control a writing operation with respect to the field memories M1 and M2.

The WRST signal is synchronous with an input V, while the WCLK, corresponding to a bit rate of a digital input video signal, is synchronous with an input H. The synchronicity can be established by locking a WCLK into an input H in a phase locked loop (PLL) circuit, or the like. An input video signal is alternately written into the field memories M1 and M2 by the WE1 and WE2 signals which correspond to an effective display period of an input video signal such that a video signal for an odd field is written in the field memory M1, and a video signal for an even field thereof is written in the field memory M2, or the like. Upon a start of writing of a field period of a video signal, i.e. upon an input V, the input video clock generator 12 outputs a WRST signal to thereby reset write address counters incorporated into the field memories M1 and M2. The number of WCLK is then counted while a WE1 or WE2 signal is at an H (high) level (enabling), to thereby increment a write address. WE1 and WE2 signals are generated corresponding to a period when effective video data is present, and no WE1 or WE2 signal is generated corresponding to vertical and horizontal blank intervals. However, additionally, no WE1 or WE2 signal may be generated corresponding to a period when data about peripheral areas (that is, top, bottom, right, and left portion) of a screen present, because typical display devices do not display in these areas. As an example, a WE1 or WE2 signal may be generated corresponding only to a period for scanning approx. 240 horizontal scanning lines in a field comprising 262 or 263 horizontal scanning lines. This arrangement will enable a reduced memory capacity.

The display video clock generator 14 generates a horizontal synchronizing signal (display H) and a vertical synchronizing signal (display V) for a display video signal and outputs a read clock (RCLK), a read address reset signal (RRST), and a write enable signal (RE1, RE2), so as to control an operation for reading from the field memories M1 and M2.

An RRST signal is synchronous with a display V. RE1 and RE2 signals correspond to an effective display period of an input video signal. The field memories M1 and M2 are switched between them to act as a read memory by RE1 and RE2 signals. The clock generator 14 generates a RCLK, a display H based on a RCLK, and a display V synchronous with a display H.

Upon a start of respective reading of a field of the video data, i.e. upon a display V, a RRST signal is generated so that an address counter incorporated into the field memories M1 and M2 are reset. Then, the number of RCLK is counted while an RE1 or RE2 signal is at an H level, to thereby increment a read address.

Note that display H and V signals may be externally input to the display video cock generator 14 so that a RCLK is generated in synchronism therewith. With this arrangement, the present invention can be applied to cases where the display device has a pre-determined synchronizing signal.

The timing control circuit 10 includes an address observation circuit 16 for detecting an occurrence of a pass-by of a write/read address, referring to input V, display H, and display V signals. Based on the detection result, the address observation circuit 16 generates and supplies a MON signal to the clock generator 14. A MON signal is used for switching between the field memories M1 and M2 to determine a read memory. The clock generator 14, which usually selects the field memories M1 and M2 alternately as a read memory, switches between the RE1 and RE2 signals in response to the MON signal so as to switch a read operation from between the field memories M1 and M2.

Switching of Reading from between Memories M1 and M2

A switching operation of reading from between the field memories M1 and M2 according to this embodiment will be described with reference to FIGS. 3 and 4.

An input video signal is switched upon a fall of a WE (WE1 or WE2) signal locked to an input V, so that video data of the input video signal for fields (fn−3) to (fn+1) are written into the field memory M1 and M2 alternately. A read memory is also switched between the field memories M1 and M2 in response to a display V, so that video data therein is read therefrom.

Figure 3:
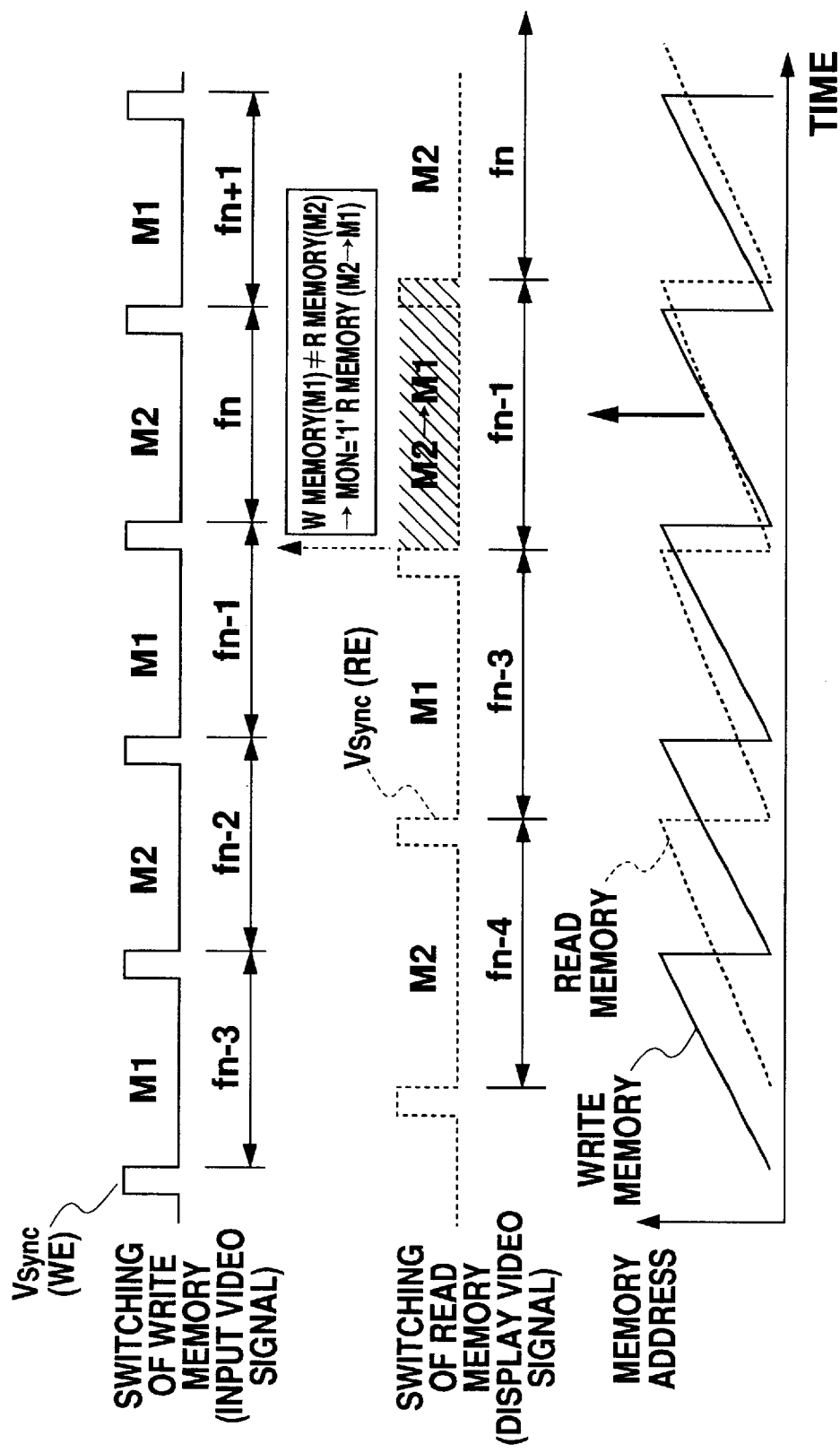
FIG. 3 is a time chart used for explaining timing for switching a read memory in cases where a read clock is slower than a write clock.

In the example shown in FIG. 3, however, a RCLK is slower than a WCLK. Thus, while reading video data for a field (fn−2) from the memory M2 after reading video data (fn−3) from the memory M1 on a reader side, a write address to which video data of field (fn) is written in the memory M2 passes by the read address from which video data (fn−2) is read. If no correction is made to this situation, a display video signal of this field presents a video based on video data (fn−2) for the first half of the field and video data (fn) for the rest.

In order to prevent this situation, according to the present invention, the address observation circuit 16 detects a write address passing by a read address in one memory. With a pass-by detected, the address observation circuit 16 outputs a MON signal so that the clock generator 14 switches a read memory from one memory to the other memory, referring to the state of the MON signal. That is, the clock generator 14 switches from the field memory M2 to M1 as a read memory as for the field with slant lines in FIG. 3, so as to consequtively output the video data (fn−1). In this way, the field memory M1 is read twice for two field periods, omitting video data (fn−2). Thereafter, video data is read from the field memories M2 and M1 alternately until the next pass-by occurs. When the next pass-by occurs, video data is similarly read from the same field memory M1 or M2 for two fields periods, omitting video data for one field.

As described above, a pass-by in which a write address gets ahead of a read address, can be prevented.

Figure 4:
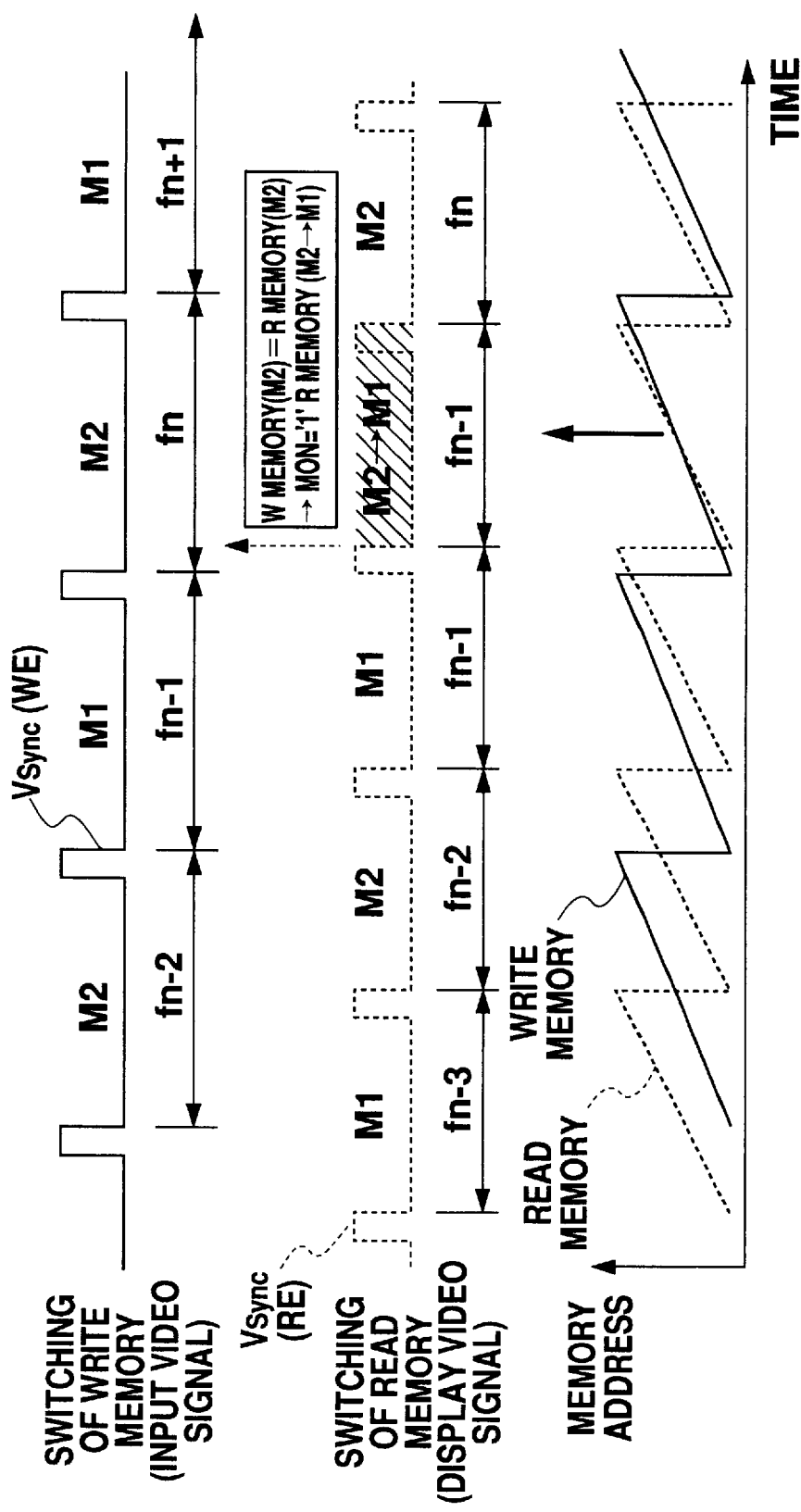
FIG. 4 is a time chart used for explaining timing for switching a read memory in cases where a read clock is faster than a write clock.

FIG. 4 shows a case where an RCLK is faster than a WCLK. In this case, according to the present invention, after video data (fn−1) is read from the memory M1, the same video data (fn−1) is read from the same frame memory M1. In this way, a situation can be prevented where a read address passes by a write address while video data (fn) is being written to the frame memory M2, causing the video data (fn−2) to be read again.

In particular, according to the present invention, although video data for one field (field (fn−1) in the above example) is read twice at a pass-by, degraded display quality due to missing video data in one field period can be prevented as other factors remain the same.

Observation of address pass-by

Detection of write/read address pass-by by the address observation circuit 16 will be described with reference to FIGS. 5 and 6.

Figure 5:
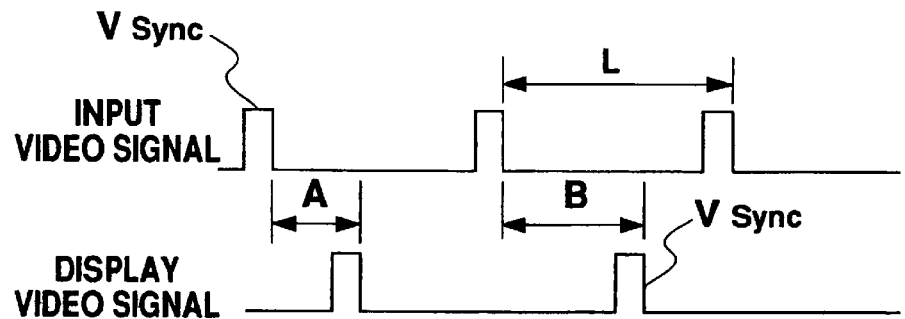
FIG. 5 is a time chart used for explaining a lag between an input video signal and a display video signal.

FIG. 5 shows a relationship between vertical synchronizing signals (input V and display V signals) of an input video signal and of a display video signal. In this example, an RCLK is slower than a WCLK. In the drawing, one vertical scanning period (corresponding to one field) of an input video is represented as L; a lag between a previous input V signal and a previous display V signal is represented as A; and a lag between the current input V signal and the current display V signal is represented as B.

Figure 6:
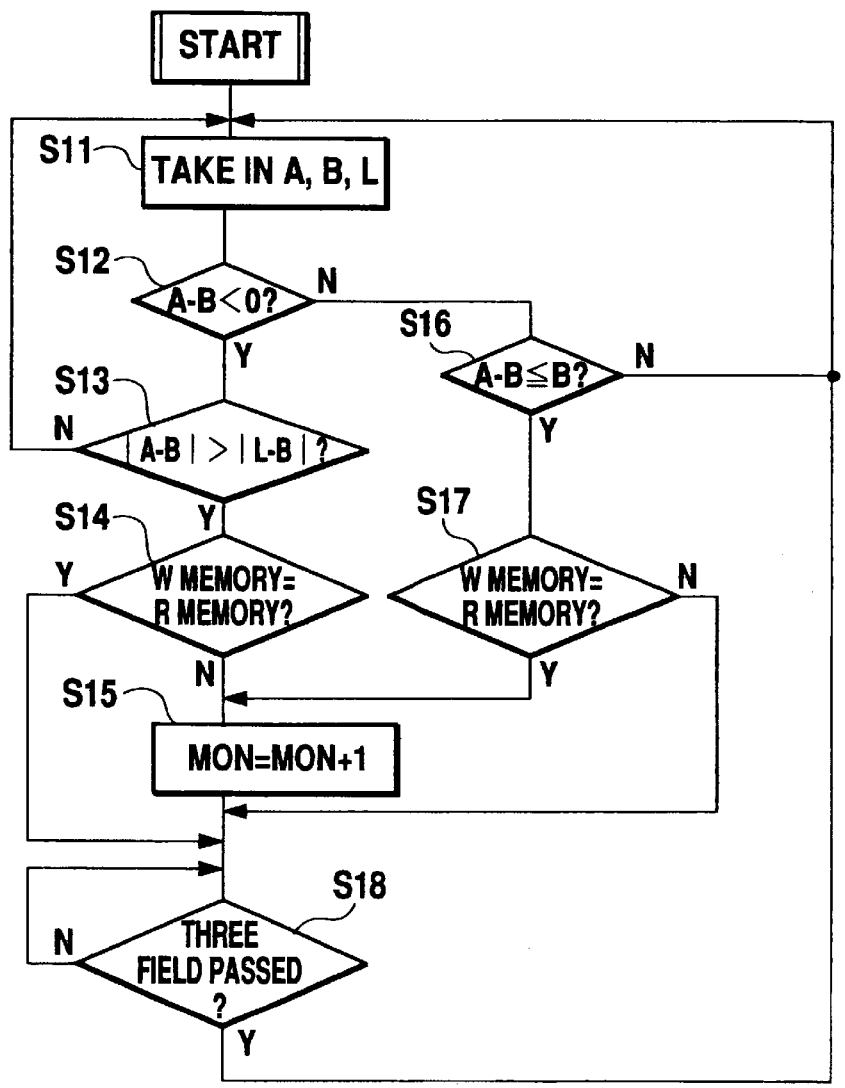
FIG. 6 is a flow chart showing an operation for switching a read memory.

Under the above condition, the address observation circuit 16 executes an operation shown in FIG. 6. When a display V is generated (a fall of the display V), the circuit 16 takes in values A and B (S11) and judges whether or not the value (A−B) is negative (S12). This judgement is made to see whether or not the lag between an input V and a display V tends to increase.

In cases where the value (A−B) is judged as negative ("Y") at S12, this judgement result means that a read clock is slower than a write clock and the lag to be increased by an amount |A−B| at the timing of the generation of the next display V signal. Then, an amount of a lag to be increased by the next generation (|A−B|) is compared to a period between a current display V signal and a next input V signal (|L−B|) at the period of the detection of the value B (S13).

If an amount |A−B| is judged as larger than a period |L−B| ("Y") at S13, this judgement result means that the relationship of generation timing between the input V signal and the display V signal will be reversed until the generation of the next display V signal. Thus, if the input V signal and the display V signal both access the same memory, a write address will pass by a read address. In order to prevent this situation, the circuit 16 judges whether or not a write memory (W memory) and a read memory (R memory) are the same (S14). In cases where they are judged as not ("N"), corresponding to the beginning of the field with slant lines in FIG. 3, where data is written to the memory M1 and read from the memory M2, this judgement result means that a W memory is switched from the memory M1 to the memory M2 while data is still being read from the memory M2, and that causes an address pass-by. In other words, if a W memory and a R memory are not the same, a pass-by will occur until the generation of the next display V signal. For preventing a pass-by, "1" is added to a MON signal so that the value thereof is changed from "0" to "1" or from "1" to "0" (S15).

On the other hand, in cases where the value (A−B) is not judged as negative ("N") at S12, this judgement result means that a read clock is faster than a write clock and the lag is reduced by an amount |A−B| at the timing of the generation of the next display V signal. It is then judged whether or not the value (A−B) is smaller than value B (S16). In cases where the value (A−B) is judged as smaller than the value B ("Y") at S16, this judgement result means that the preceding-following relationship of the generation timing between the input V signal and the display V is reversed while reading video data for the next field. In order to prevent this situation, the circuit 16 judges whether or not a W memory and a R memory are the same (S17). If they are judged as the same ("Y"), corresponding to the beginning of the field with slant lines in FIG. 4, where data is written to and read from the memory M2, a read address will pass by a write address, while data is still being written to the memory M2, by the generation of the next display V signal. For preventing a pass-by, the operation is returned to S15 to change the value of a MON signal.

When a W memory and a R memory are judged as the same ("Y") at S14 or not the same ("N") at S17, an address pass-by in the same memory does not occur. Thus, it is unnecessary to change the value of a MON signal.

In cases where either the write and read memories are judged as the same ("Y") at S14 or not the same ("N") at S17, or a MON signal is set at "1" in S15, the circuit 16 judges whether or not a read/write operation period for video data for three field periods is passed (S18), and when three field periods are passed, the operation returns to S11. Then, the address observation circuit 16 takes in the next values A and B and repeats the foregoing operation for the next field. Note that in cases where the value |A−B| is judged as not larger than the value |L−B| ("N") at S13, or the value (A−B) is not equal to or smaller than the value B ("N") at S16, a read address will not pass by a write address for a period until the generation of the next display V signal. Thus, the circuit 16 takes in the next values A and B at the generation of the next display V signal to repeat the foregoing operation.

Note that, although an address pass-by is detected, the operation will not return to S11 until an operation for three fields are passed at S18, as described above. This is because calculations made immediately after a pass-by are rarely computed correctly, and conversion between video signals having significantly different synchronizing timings from each other such that a pass-by occurs within three fields is, in an actual fact, not practical.

Structure of Address Observation Circuit

Figure 7:
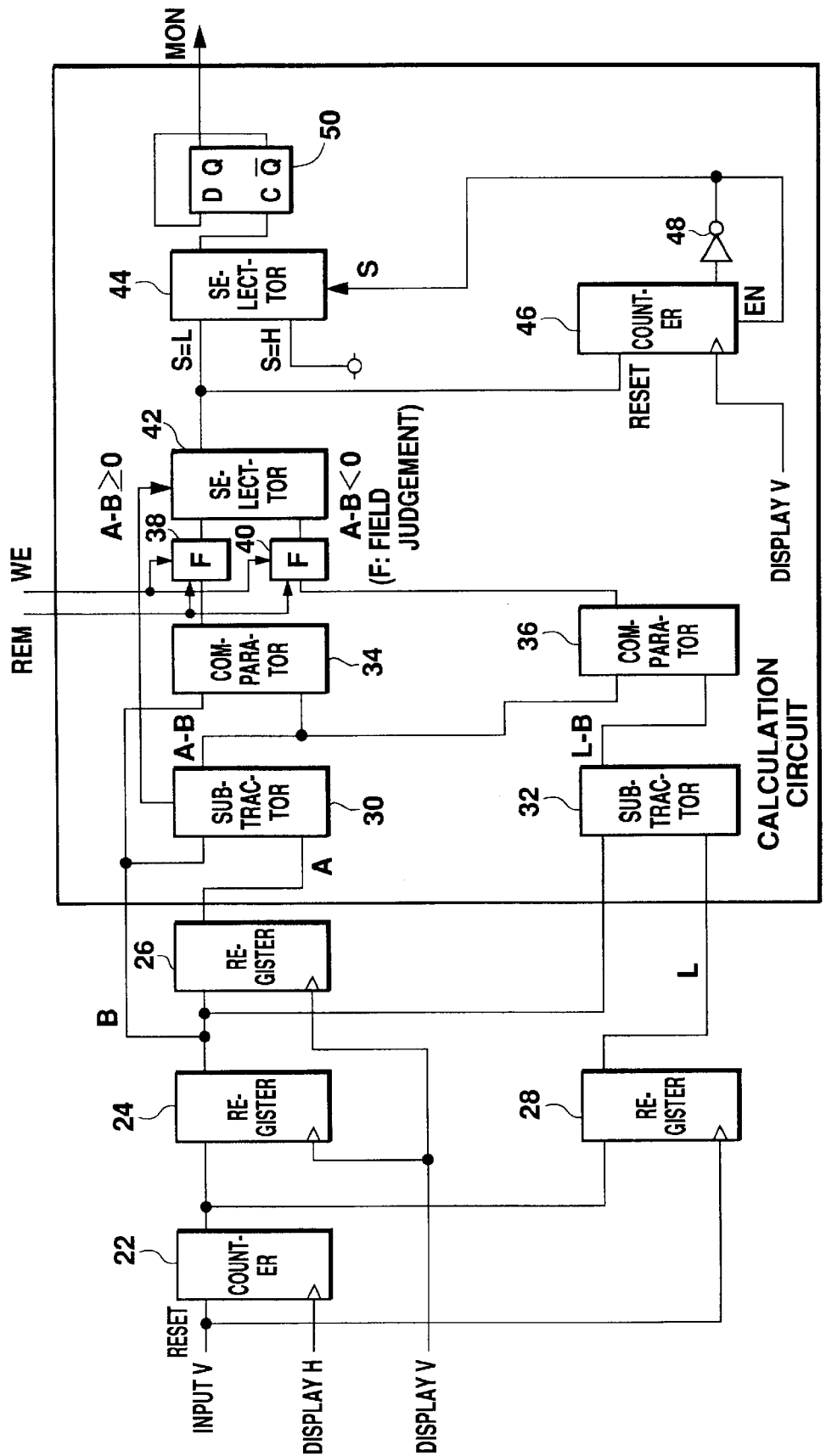
FIG. 7 is a block diagram showing the structure of an address observation circuit.

FIG. 7 shows an example of the structure of an address observation circuit 16. A counter 22, to be reset upon receipt of an input V, receive a display H as a clock and thus counts the number of horizontal scanning lines of a display video signal.

The counter 22 supplies an output to a data input terminal of a register 24. The register 24 supplies an output to a data input terminal of a register 26. The registers 24 and 26, receiving a display V as a clock, take in data which is then supplied to the respective data input terminals, upon a fall of a display V. That is, the register 24 takes in the number B of the horizontal scanning lines between a fall of an input V and a fall of a display V, while the register 26 takes in a value A, that is, a value which the register 24 took in at a one prior fall of a display V.

The counter 22 also supplies an output to a register 28 which takes in the output upon a fall of an input V. Thus, the register 28 takes in the number L of the horizontal scanning lines during one vertical scanning period (S11 in FIG. 5).

The registers 24 and 26 supply their respective outputs B and A to a subtractor 30 to obtain an output (A−B). Meanwhile, the registers 24 and 28 supply their respective outputs B and L to a subtractor 32 to obtain an output (L−B).

The register 24 and the subtractor 30 supply their respective outputs B and (A−B) to a comparator 34 to judge whether or not the value (A−B) is equal to or less than the value B ((A−B)≦B) (S16 in FIG. 5). The subtractors 30 and 32 supply their respective outputs (A−B) and (L−B) to a comparator 36 to judge whether the value |A−B| is larger than the value |L−B| (|A−B|>|L−B|) (S 13 in FIG. 6). With the judgement results both being "1," that is, "Y," judgement outputs from field judgement sections 38 and 40 are supplied to a selector 42. On the other hand, with the judgement results both being "0," that is, "N," that judgement results of comparator 34 and 36 are supplied intact to the selector 42. The selector 42 selects an output of the field judgement section 38 when a judgement result at S12 in FIG. 6 shows (A−B≧0) and selects an output of the field judgement section 40 when the result shows (A−B<0). Note that the field judgement sections 38 and 40 judge whether or not a W memory and an R memory are the same (S14 and S17 in FIG. 6) by judging whether or not an REM signal (See FIG. 8) and a WE signal are the same.

An output of the selector 42 is output as a MON signal via the selector 44 when the selector 44 receives a signal S at a low (L) level (a signal S "L"). A MON signal is controlled by an output of a counter 46. That is, the counter 46, reset by an output of the selector 42, counts a display V and outputs a signal at a high (H) level (a signal "H") at a count value of three. After inversion by an invertor 48, the signal is supplied to a control terminal of the selector 44 as a signal S and also to an enable signal input terminal EN of the counter 46.

Therefore, after the counter 46 is reset upon a rise of an output of the selector 42, it receives a signal S "H" at its terminal EN and thereby starts counting a display V. At the same time, the selector 44 receives a signal "H" at the control terminal as a signal S, so that it selects and outputs a signal "L," prohibiting a signal from the selector 42. When the counter 46 counts three fields, i.e., three display V signals, the counter 46 outputs a signal "H," so that the selector 44 receives a signal S "L" at its control terminal and thereby prepares for outputting an output of the selector 42 intact. At this moment, the enable signal input terminal EN receives also a signal "L" so that counting by the counter 46 is prohibited.

When an output of the selector 42 rises as described above, the selector 44 does not output a signal "H" for three fields passed after outputting a risen output of the selector 42 (S18 in FIG. 6).

The selector 44 supplies its output as a clock to a flip flop 50 which inputs its inverted output $\overline{Q}$ to a data input terminal D of its own. Thus, the flip flop 50 repeats outputting signals "1" and "0" alternately for every receipt of a signal "H" from the selector 44. In other words, the flip flop 50 outputs signals "1" and "0" alternately at every occurrence of an address pass-by (S15 in FIG. 6).

Figure 8:
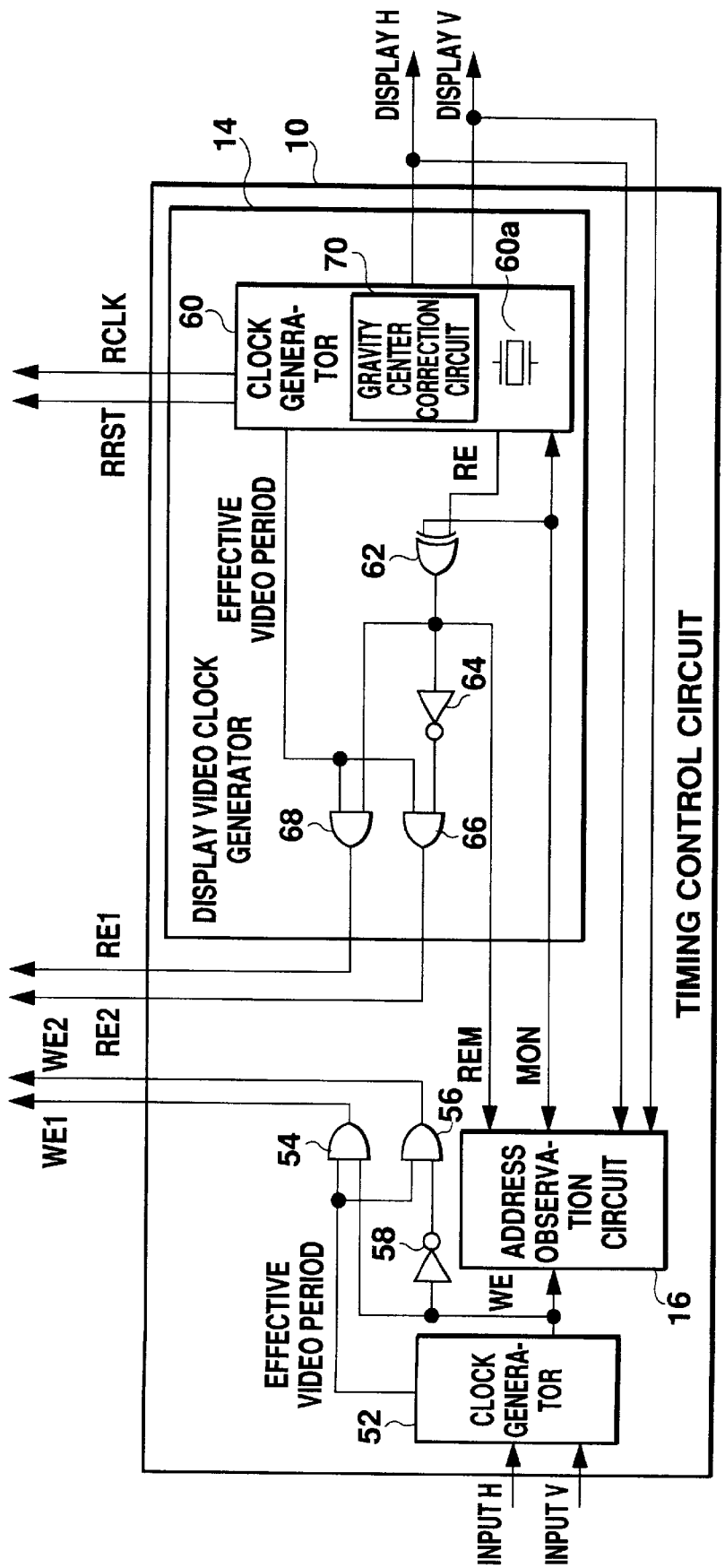
FIG. 8 is a block diagram showing the structure of a timing control circuit.

Structure of Timing Control circuit FIG. 8 shows the structure of a timing control circuit 10. A display video clock generator 14 includes a clock generator 60 which incorporates an oscillator 60a (a crystal oscillator is externally attached to the integrated circuit). Based on a clock from the oscillator 60a, the clock generator 60 forms and outputs a display H, a display V, a RRST signal, and a RCLK. The clock generator 60 also generates an RE signal (a signal for indicating an odd/even field) which alternately indicates "0" and "1" in response to a fall of a display V.

RE and MON signals are input to an exclusive OR gate 62. With the MON signal "1," the OR gate 62 inverts the RE signal and outputs this inverted RE signal. On the other hand, with the MON signal "0," the OR gate 62 outputs the RE signal intact. An output of the OR gate 62 is input intact to an AND gate 68, and to an AND gate 66 after being inverted by an invertor 64. The AND gates 66 and 68 receive a signal "H" during an effective video period.

With this arrangement, when a MON signal shows "0," an RE signal is output intact from and AND gate 68 as an RE1 signal, and an inverted RE signal is output from the AND gate 66 as an RE2 signal. As a result, a video signal is read from the memories M1 and M2 alternately according to alternation of RE signals "H" and "L." On the other hand, when a MON signal shows "1," an inverted RE signal is output from the AND gate 68 as an RE1 signal, and an RE signal is output intact from the AND gate 66 as an RE2 signal. As a result, a video signal is read from the memories M2 and M1 alternately according to alternation of RE signals "H" and "L." Note that RE1 and RE2 signals are at an H level only during an effective video period as restricted by the AND gates 66 and 68.

An input video clock generator 12 (see FIG. 2) includes a clock generator 52 which generates a WCLK, a WRST signal, and a WE signal, based on an input H and an input V. A WE signal is input intact to an AND gate 54 and to an AND gate 56 via an invertor 58. Since the AND gates 54 and 56 are supplied with an effective video period signal as well, they output WE1 and WE2 signals to the memories M1 and M2. Note that a WE signal is also supplied to the address observation circuit 16.

Structure of Video gravity center correction Circuit

As described above, when a read memory is switched in response to a MON signal, video data for one field is inserted or deleted, causing a change in the order of even and odd fields. Provide that, for instance, scanning line data for an odd field is m, m+2, m+4, m+6 . . . , while that for an even field is m+1, m+3, m+5, m+7 . . . In general, video scanning data is displayed in the screen in the order m, m+1, m+2, m+3, m+4 . . . However, when video data for one field is inserted or deleted, a displaying order of video scanning data is changed to be m+1, m, m+3, m+2, m+5 . . .

In order to avoid such disorder, data of an odd field which is to be displayed in an even field is shifted upward by one scanning line.

Figure 9:
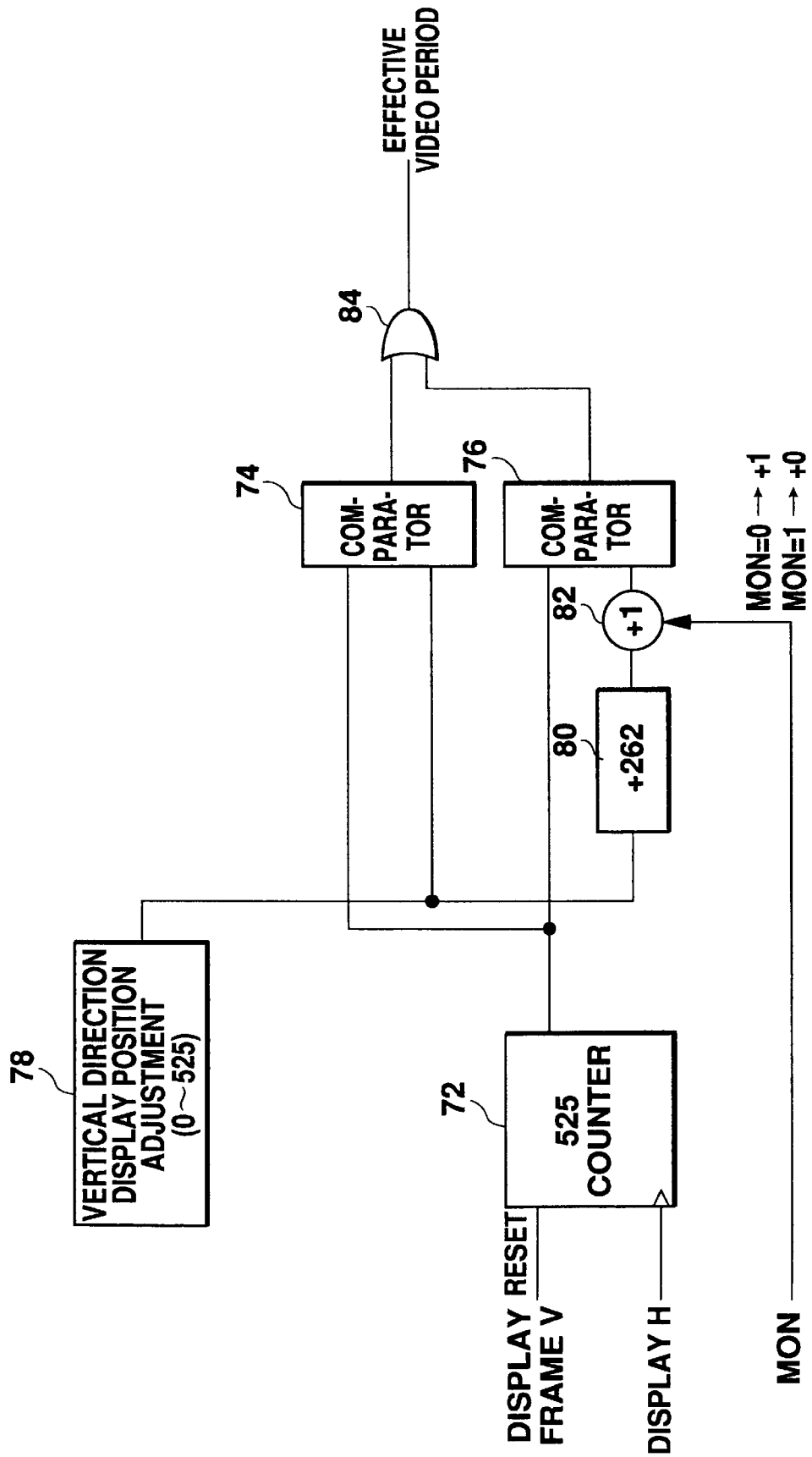
FIG. 9 is a block diagram showing the structure of a video gravity center correction circuit.

For this purpose, according to the present invention, the clock generator 60 is provided with a video gravity center correction circuit 70 for correcting a displacement of a video center due to the above disorder caused by switching of a read memory in response to a MON signal. The structure of a video gravity center correction circuit 70 will be described with reference to FIG. 9.

A 525 counter 72 is reset by a display frame V and counts a display H. Thus, the 525 counter 72 counts 525 display H signals for one frame. The 525 counter 72 may be reset by a display V for every field, or through recognition of a display V of an odd or even field.

The 525 counter 72 supplies an output to comparators 74 and 76. The comparator 74 also receive an effective video period signal from a vertical direction display position adjuster 78, and the comparator 76 also receives the same via a 262 adder 80 and a 1 adder 82. The 1 adder 82 adds "0" to a MON signal "1," and "1" to a MON signal "0." When displaying data for a first field of a frame, the display position adjuster 78 outputs a signal indicating 15 to 248, wherein 15 horizontal lines at top and bottom portion, respectively, of one field are omitted. The signal is supplied to the comparator 74, which outputs a signal "H" when the 525 counter 72 outputs a counter value 15 to 248.

On the other hand, when displaying a second field of the same frame, provided that a MON signal indicates "1" and the 1 adder 82 adds "0," the adjuster 78 outputs a signal indicating 277 to 510 to the comparator 76, so that the comparator 76 outputs a signal "H" when the 525 counter 72 outputs a counter value 277 to 510. Further, provided that a MON signal indicates "0," the comparator 76 outputs a signal "H" when the 525 counter 72 outputs a counter value 278 to 511. The OR gate 84 adds outputs of the comparators 74 and 76 and outputs a signal "H" when either of the outputs indicate "H," to thereby determine an effective video period.

Figure 10A:
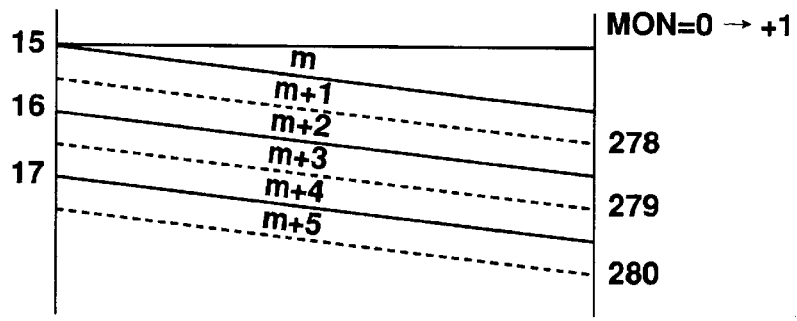
FIG. 10A is a diagram used for explaining an operation for correcting a video center.
Figure 10B:
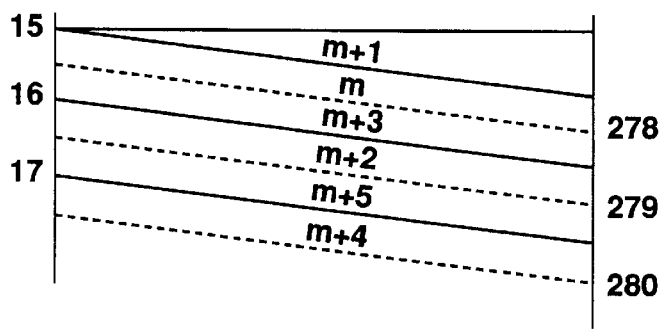
FIG. 10B is a diagram used for explaining an operation for correcting a video center.
Figure 10C:
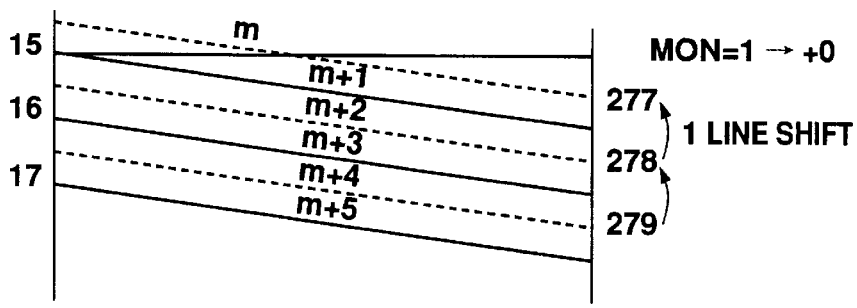
FIG. 10C is a diagram used for explaining an operation for correcting a video center.

As described above, although an entire display of a screen image is shifted upward by ½ horizontal scanning line, compared to the cases of a MON signal "0" (FIG. 10A) when a MON signal indicates "1" (FIG. 10C), scanning line data are prevented from being reversed as shown in FIG. 10B. As a result, a displaced video center is corrected for display.

Switching of writing to memories M1 and M2

Figure 11:
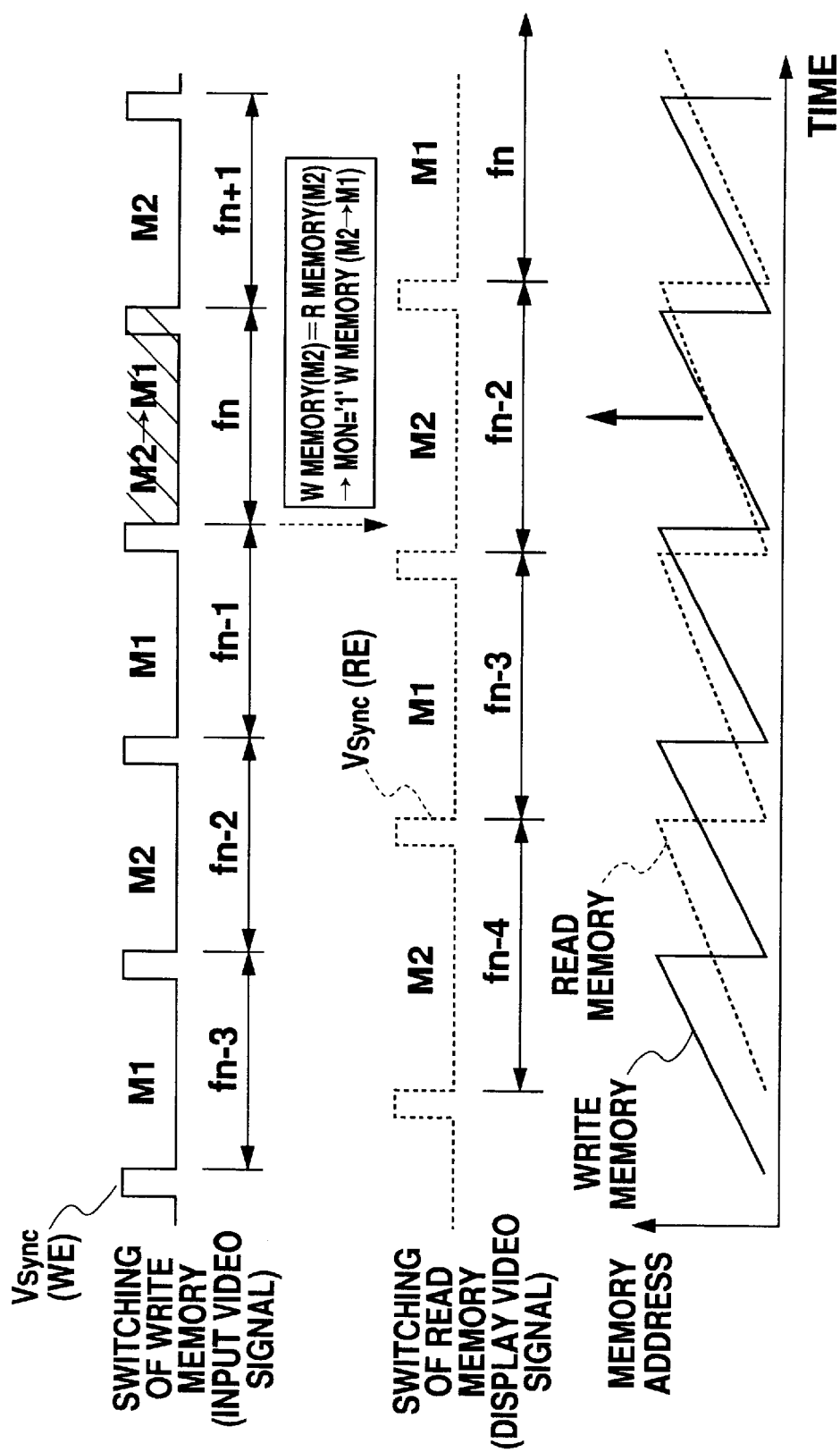
FIG. 11 is a time chart used for explaining timing for switching a write memory in cases where a read clock is slower than a write clock.
Figure 12:
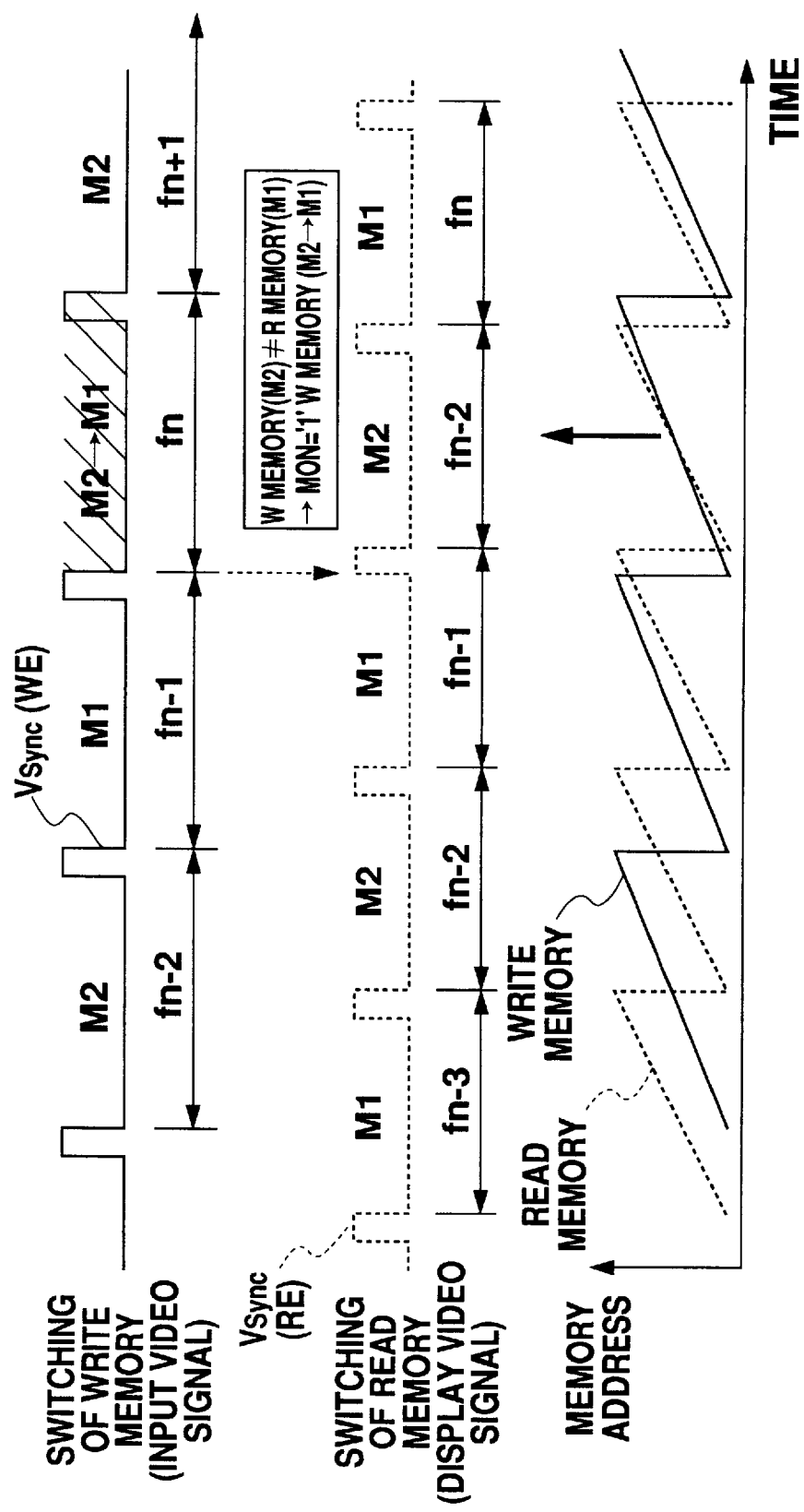
FIG. 12 is a time chart used for explaining timing for switching a write memory in cases where a read clock is faster than a write clock.

In the above example, when an address pass-by is predicted, video data is twice read from the same memory, though video data may be written to the same memory twice on end, as shown in FIGS. 11 and 12. In such a case, instead of generating a MON signal based on a display V in the above example, a MON signal may be generated based on an input V (a fall of an input V) and supplied to the input video clock generator 12, as shown by a dotted arrow in FIG. 2, so that WE1 and WE2 signals on a writing side are inverted in response to a MON signal.

For this arrangement, the same circuit as that of the above example can be used after exchanging constructions of an input video clock generator 12 and a display video clock generator 14.

In addition to the above modified arrangement in which a MON signal is generated based on an input V, the timing control circuit 10 may be constructed such that writing is prohibited for one field only when an address pass-by is predicted.

In FIG. 11, an RCLK is slower than a WCLK. Thus, while a video signal (fn-2) is being read from the memory M2 after video data (fn-3) was read from the memory M1, an address to which video data (fn) is written passes by the address from which the video data (fn-2) is read. If no correction is made to this situation, this field of a display video signal comprises video data (fn-2) for the first half and video data (fn) for the rest.

To prevent this situation, according to the present invention, the address observation circuit 16 detects a write address passing by a read address within one memory. With a pass-by detected, the address observation circuit 16 outputs a MON signal so that the clock generator 12 switches a write memory from one memory to the other according to the state of the MON signal. That is, the clock generator 12 switches from the field memory M2 to M1 as a read memory as for the field with slant lines shown in FIG. 11, to thereby write video data (fn) in the memory M1. In this way, video data is written to the memory M1 twice on end, omitting video data (fn-1).

FIG. 12 shows a case where an RCLK is faster than a WCLK. In this case, after video data (fn-1) is written to the memory M1, video data (fn) is written to the same frame memory M1. In this way, video data (fn-2) is inserted into between video data (fn-1) and (fn). As a result, a situation can be prevented where a read address passes by a write address while video data (fn) is being read from the memory M2 and causing shifting of video data reading from (fn) to (fn-2).

Note that, in this arrangement, although video data (fn-2) is inserted but not video data (fn-1), display quality is not adversely affected since the video data (fn-2) is immediately prior to the video data (fn-1), both being adjacent.

Other Structures

In the above example, two fields memories are provided. However, two frame memories may be provided instead. With frame memories provided, a read or write memory is switched for every frame, and video data is inserted or deleted for every frame. Thus, a display video will not be shifted by a displaced video due to switching of memories, and correction of a video center is thus unnecessary.

Note that the present invention may be applied to a system for prohibiting data writing, utilizing a single frame memory, when an address pass-by is predicted. For such an arrangement, field judgement may be omitted at S14, S17 in FIG. 6.

The scope of the claims is not limited to the above preferred embodiments.

What is claimed is:

1. A video processing device for obtaining a display video signal according to a synchronizing signal different from a synchronizing signal for an input video signal by writing an input video into a memory according to a write clock and reading a video signal from a memory according to a read clock, comprising:

a lag amount detection circuit for detecting a lag amount between a vertical synchronizing signal of a display video signal and a vertical synchronizing signal of an input video signal;

a varied lag amount detection circuit for detecting an amount varied with time of the lag amount;

a comparison circuit for comparing the lag amount detected and the amount varied with time of the lag amount; and a control circuit for controlling an access to a memory during a video display unit period wherein the sequence of a vertical synchronizing signal of an input video signal and a vertical synchronizing signal of a display video signal is about to be inverse, based on a result by the comparison circuit.

2. A video signal processing device according to claim 1, further comprising:

the memory including two memory circuits;

a judgement circuit for judging whether or not a writing operation and a reading operation are both executed to a same memory; and the control circuit for controlling the access to the memory in response to results of the comparison circuit and the judgement circuit, such that a memory accessed for reading or writing is repeatedly accessed for reading or writing.

3. A video signal processing device according to claim 2, further comprising;

the two memory circuits, each consisting of a field memory, for storing a video signal for one field alternately; and a video gravity center correction circuit for shifting a video signal of one field for a purpose of correcting a reverse between an odd field and even field of a display video signal.

4. A video signal processing device according to claim 1, wherein the lag amount detection circuit detects a previous lag amount and a current lag amount regarding two adjacent vertical synchronizing signals of an input video signal or a display video signal, the varied lag amount detection circuit detects an amount varied with time of a lag amount, based on a difference between the previous lag amount and the current lag amount, and the comparison circuit compares the current lag amount and an amount varied with time of a lag amount currently detected and judges whether or not a preceding-following relationship between vertical synchronizing signals of an input video signal and a display video signal will be reversed in accordance with a variation of a lag amount until next detection.

5. A video signal processing device according to claim 4, further comprising:

the memory including two memory circuits;

a judgement circuit for judging whether or not a writing operation and a reading operation are both executed to the same memory; and the control circuit for controlling the access to the memory in response to results of the comparison circuit and the judgement circuit, such that a memory accessed for reading or writing is repeatedly accessed for reading or writing.

6. A video signal processing device according to claim 5, further comprising;

the two memory circuits, each consisting of a field memory, for storing a video signal for one field alternately; and a video gravity center correction circuit for shifting a video signal of one field for a purpose of correcting a reverse between an odd field and an even field of a display video signal.

7. A video processing device according to claim 4, wherein, the comparison circuit judges that a preceding-following relationship between vertical synchronizing signals of an input video signal and a display video signal will be reversed in either case of $|A-B|\leq B$ or $|A-B|>|L-B|$,
A being the previous lag amount,
B being the current lag amount,
$|A-B|$ being the amount varied with time of the lag amount,
$|L-B|$ being the variation in the lag amount until next detection.

8. A video signal processing device for obtaining a display video signal according to a synchronizing signal different from a synchronizing signal for an input video signal by writing an input video signal into a memory according to a write clock and reading a video signal from a memory according to a read clock, comprising:

two memories each accessed alternately for writing an input video signal or reading a display video signal;

a judgement circuit for judging whether or not one of read/write addresses will pass by one of read write addresses when accessing a same memory, wherein, upon detection that one address will pass by another address, the same memory is repeatedly accessed for data reading to writing, prohibiting a change of a read or write memory;

wherein the judgement circuit includes a lag detection circuit for detecting a previous lag amount and a current lag amount regarding two adjacent vertical synchronizing signals of an input video signal or a display video signal;

a varied lag amount detection circuit for detecting an amount varied with time of a lag amount, based on a difference between the previous lag amount and the current lag amount; and a comparison circuit for comparing the current lag amount and an amount varied with time of a lag amount currently detected and judging whether or not a preceding-following relationship between vertical synchronizing signals of an input video signal and a display video signal will be reversed in accordance with a variation in a lag amount until next detection.

9. A video processing device according to claim 8, wherein, the comparison circuit judges that a preceding-following relationship between vertical synchronizing signals of an input video signal and a display video signal will be reversed in either case of $|A-B|\leq B$ or $|A-B|>|L-B|$,
A being the previous lag amount,
B being the current lag amount,
$|A-B|$ being the amount varied with time of the lag amount,
$|L-B|$ being the variation in a lag amount until next detection.

10. A video signal processing device according to claim 8, further comprising;

the two memory circuits, each consisting of a field memory, for storing a video signal for one field alternately; and a video gravity center correction circuit for shifting a video signal of one field for a purpose of correcting a reverse between an odd field and an even field of a display video signal.

* * * * *